June 17, 1969  J. KAPLAN  3,450,365
BI-DIRECTIONAL LIMIT TORQUE SLIP ELEMENT
Filed May 19, 1967

INVENTOR.
JOSEPH KAPLAN
ATTORNEY

June 17, 1969

J. KAPLAN 3,450,365

BI-DIRECTIONAL LIMIT TORQUE SLIP ELEMENT

Filed May 19, 1967

INVENTOR.
JOSEPH KAPLAN

BY

ATTORNEY

United States Patent Office 3,450,365
Patented June 17, 1969

3,450,365
BI-DIRECTIONAL LIMIT TORQUE SLIP ELEMENT
Joseph Kaplan, 39 Fair Lane, Jericho, N.Y. 11753
Filed May 19, 1967, Ser. No. 639,909
Int. Cl. B65h 17/02
U.S. Cl. 242—67.4                     5 Claims

ABSTRACT OF THE DISCLOSURE

This invention relates to a bi-directional limit torque slip element including a helically coiled spring frictionally engaging relatively rotatable generally cylindrical surfaces for transmission of rotation in opposite directions with the same or different limit torques in the opposite directions, as desired, in accordance with the relative spring distention in its engagement with cylindrical surfaces.

Background of the invention

As is well known, the problems concerned with conventional slip clutches, drag brakes, slip couplings, and the like, are especially concerned with reliability, control and versatility. Prior slip elements have been unreliable and uncontrollable in operation, being seriously affected by variations in slip velocity, lubrication, and temperatures, so that relatively complex mechanisms have been required to achieve slippage at predetermined limit torques.

Summary

Accordingly, it is an important object of the present invention to provide substantial improvements in slip clutches, drag brakes, slip couplings, and the like, which are virtually unaffected by slip velocity, lubrication, or temperature extremes, and which are adapted to be accurately calibrated for slippage at any desired limit torque.

It is another object of the present invention to provide slip elements of the type described which are capable of bidirectional limit torque slippage, wherein the limit torques may be the same or distinctly different, and of widely varying values, for the opposite directions of rotation.

It is a further object of the present invention to provide slip-element structures having the advantageous characteristics mentioned in the preceding paragraphs, which are relatively simple and sturdy in construction, durable, accurate and reliable throughout a long useful life, and which can be economically manufactured, installed and maintained, for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Description of the preferred embodiments

Figure 1:
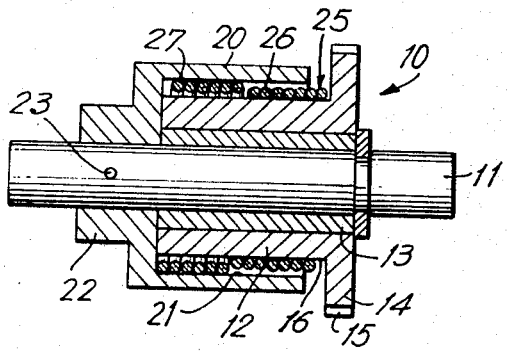
FIGURE 1 is a longitudinal sectional view showing a bidirectional slip element constructed in accordance with the teachings of the present invention.
Figure 2:
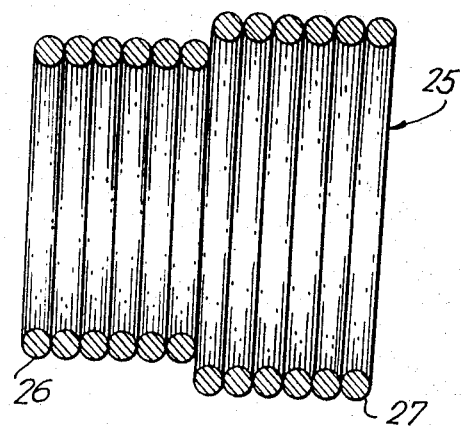
FIGURE 2 is a longitudinal sectional view showing a spring member of the slip element of FIGURE 1, enlarged for clarity, apart from the remainder of the slip element.

Referring now more particularly to the drawings, and specifically to FIGURES 1 and 2 thereof, a slip element is generally designated 10 in FIGURE 1 and includes a rotary shaft 11 having mounted thereon a tubular mandrel 12, axially rotatable about the shaft 11, as by a journal bearing 13 interposed between the mandrel 12 and shaft 11. A circumferential flange 14 may be provided on one end of the mandrel, which may be provided with peripheral teeth 15 as for being driven from a suitable power source. It will be appreciated that the external surface of the mandrel 12, as at 16, is generally cylindrical and substantially coaxial with the shaft 11.

Spacedly surrounding the mandrel 12 is a hollow outer tubular member or drum 20 having an internal generally cylindrical surface 21 in generally coaxial, or outwardly spaced substantially concentric relation with the external mandrel surface 16. At one end of the drum 20, remote from the mandrel flange 14, the drum may be provided with a hub 22, which may be pinned or keyed, as at 23, to the shaft 11. Interposed between the generally coaxial surfaces 16 and 21 is a slip member, generally designated 25, and best seen in FIGURE 2. The slip member may consist of a helically coiled spring configured in a stepped arrangement, with one part 26 adjacent to one spring end of one diameter, and the remaining part 27 adjacent to the other spring end of a different diameter. More specifically, the spring 25 has its part 26 of a relatively small diameter and its part 27 of a relatively large diameter. The part 26 of smaller diameter is distended by radial expansion and engaged externally about the external mandrel surface 16, while the spring part 27 of larger diameter is distended by radial contraction and engaged interiorly of and frictionally with the internal cylindrical surface 21. The amount of distention of the spring parts 26 and 27 predetermines the slip or limit torque, which in turn may be predetermined by the size of spring wire, unstressed coil diameter, and cylindrical surface diameter. In practice, the limit torque is effectively directly proportional to the stress imparted to the spring parts 26 and 27 upon assembly in engagement with respective cylindrical surfaces 16 and 21.

Upon operation, as by rotation of mandrel 12 through its drive flange 15, it will be appreciated that mandrel rotation in one direction causes the coils of spring part 26 to tightly grip the mandrel and upon reaching of a predetermined limit torque causes the coils of spring part 27 to slip on the internal drum surface 21. Conversely, mandrel rotation in the opposite direction effects tightening of the coils of spring part 27 in their frictional engagement with the internal cylindrical surface 21, and, upon reaching of the limit torque, effects slippage of the coils of spring part 26 on the external mandrel surface 16.

As will now be understood, the operation is one of bidirectional limit torque slippage; and furthermore the particular limit torque in each direction may be independently predetermined and calibrated by proper selection of parameters to achieve the necessary stress of spring coils when engaged with the respective cylindrical surfaces 16 and 21.

Figure 3:
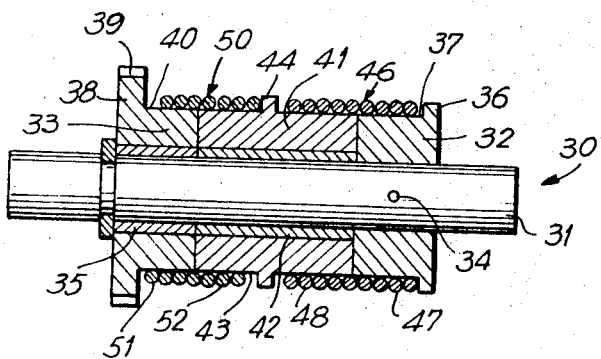
FIGURE 3 is a longitudinal sectional view showing a slightly modified embodiment of slip element of the present invention.

Another slip-element construction achieving the bidirectional limit torque slippage, with independently calibrated limit torques for opposite directions of rotation, is shown in FIGURE 3, and there generally designated 30. The slip element 30 may include an axially rotatable shaft 31 and a pair of mandrels 32 and 33 circumposed about the shaft in spaced relation therealong. The mandrel 32 may be pinned or keyed to the shaft 31, as by pin 34, while the mandrel 33 may be supported for rotation relative to and coaxially of the shaft, as by a journal bearing 35. The mandrel 32 may have a circumferentially extending end flange 36, remote from the mandrel 33, the remainder of the external surface 37 of mandrel 32 being generally cylindrical and substantially coaxial with shaft 31. Remote from the mandrel 32, the mandrel 33 may be provided with a circumferentially extending, outstanding flange 38, say having peripheral teeth or suitable drive formations 39, while the remainder of the external surface 40 of mandrel 33 is also generally cylindrical and substantially coaxial with the shaft 31 and surface 37.

In the space between the mandrels 32 and 33, surrounding the shaft 31 is an intermediate mandrel 41 supported on the shaft 31 for rotation thereabout, as by a journal bearing 42. The intermediate mandrel 41 may have a generally cylindrical external surface 43 substantially coaxial with the shaft 31, as well as the cylindrical surfaces 37 and 40, while a circumferential rib or collar 44 may be provided on the intermediate mandrel 41 outstanding from the external surface 43 thereof. In the illustrated embodiment, the cylindrical surfaces 37, 40 and 43 of respective mandrels 32, 33 and 41 may all be of substantially the same diameter.

A helically coiled spring, generally designated 46, is wound in one direction say right-handed, and circumposed about and in frictional engagement with the external surface 37 of mandrel 32 and adjacent portion of external surface 43 of intermediate mandrel 41. That is, the spring 46 has one end portion or part 47 frictionally engaged about the surface 37, and has its other end portion or part 48 frictionally engaged about the adjacent region of surface 43. An additional helically coiled spring, generally designated 50, is wound in the opposite direction say left-handed, and has one end portion of part 51 circumposed in frictional engagement about the surface 40 of mandrel 33, having its other end portion or part 52 circumposed in frictional engagement about the adjacent region of intermediate mandrel surface 43.

In use, the shaft 31 and pinned mandrel 32 may be considered as the input side, while the mandrel 33 and its toothed flange 39 may be considered as the output side. The intermediate mandrel 41 and the springs may be considered as connection means between the input and output elements.

In operation, say upon driving the shaft 31 and input mandrel 32 in one direction of rotation, the spring 46 tightens about its engaged surfaces 37 and 43, while the spring 50 tends to expand and slip upon application of the limit torque. Rotation in the opposite direction reverses the above-described coaction, so that the spring 46 tends to expand and slip upon application of limit torque.

By way of example, the slip element of FIGURE 3 finds many applications, some of which are listed below:

(a) As an over-running clutch which has a controlled limit torque when the prime mover is driving and a light torque when the output is over-driving the prime mover.

(b) As an indexing mechanism in which the input is oscillating and the output is being indexed in one direction. In the drive direction a controlled limit torque is available for driving, while in the reverse direction the input exerts a light drag on the output which is insufficient to drive the output back.

(c) Unidirectional driving of an output shaft by a motor; a controlled limit torque in the drive direction and a negligible amount of torque when the motor reverses.

(d) The requirement for two distinct levels of limit torques for opposite directions of rotation.

Figure 4:
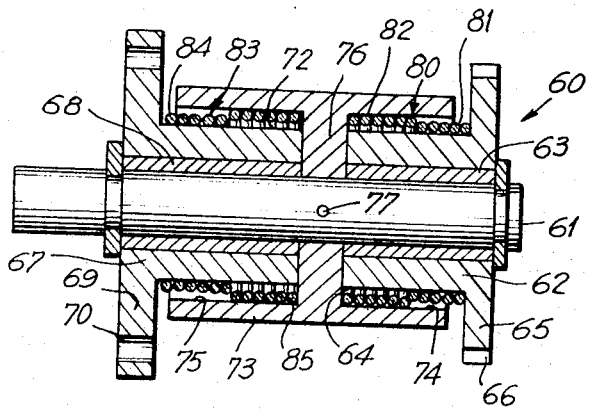
FIGURE 4 is a longitudinal sectional view showing a further embodiment of slip element in accordance with the instant invention.

A further modification is shown in FIGURE 4, wherein a slip element is generally designated 60 and includes a rotary shaft 61 having circumposed thereabout an input mandrel 62 mounted for rotation relative to the shaft, as by a journal bearing 63. The mandrel 62 is formed at one end with a circumferential, radially outstanding flange or wheel 65 having peripheral drive means or teeth 66.

An additional mandrel 67 is circumposed about the shaft 61, being rotatably supported on the latter by a journal bearing 68. At one end of the mandrel 67, remote from the mandrel 62, there is provided a radially outwardly projecting flange 69 for securement to a fixed support, as by fasteners through openings 70. The mandrels 62 and 67 are disposed in end-to-end, adjacent spaced relation, being respectively provided with external cylindrical surfaces 64 and 72 substantially coaxial with each other and with shaft 61. Further, in the illustrated embodiment, the external cylindrical surfaces 64 and 72 may be of substantially equal diameters. It will be understood, however, that the external cylindrical surfaces 64 and 72 need not be of equal diameters.

Spacedly circumposed about the mandrels 62 and 67 is a generally tubular drum 73 having generally cylindrical, internal surfaces 74 and 75 respectively adjacent to external mandrel surfaces 64 and 72. The internal cylindrical drum surfaces 74 and 75 may be generally coaxial with each other, and with the mandrel surfaces 64 and 72, and may, as in the illustrated embodiment, be of substantially equal internal diameter. The drum 73 may include, medially thereof, a web or hub 76 circumposed about shaft 61 intermediate mandrel 62 and 67, and suitably keyed to the shaft as by a pin 77.

A helically coiled spring 80 having end portions of different or stepped diameters, as at 81 and 82, is arranged with its smaller spring part 81 circumposed about and in frictional engagement with the external mandrel surface 64, and its larger part 82 inserted in and frictionally engaging the internal surface 74.

Similarly, a stepped helically coiled spring 83 has a smaller diameter part 74 snugly circumposed and frictionally engaging the external mandrel surface 72, with its larger diameter part 85 snugly inserted in and frictionally engaging the internal cylindrical surface 75.

The mandrel 62 and its toothed wheel 65 may be considered as the input, and the drum 73 and pinned shaft 77 as the output, with the mandrel 67 by its flange 69 remaining stationary. As in the first-described embodiment of FIGURES 1 and 2, the spring parts 81, 82, 84 and 85 may be selected to provide predetermined limited torques, as described. In one application of the slip element 60, the stepped spring 80 may serve as a slip clutch, and the stepped spring 83 as a drag brake. Such an application is illustrated in FIGURE 5.

It will there be observed that a pair of elements 60 have their toothed flanges or wheels 65 connected in driven relation with respect to a toothed drive wheel 86, say of a reversible motor, as by an endless belt 87. The slip elements 60 are each provided on their respective drums 73 with a tape spool 88, and a sprocket wheel 89 is carried by the reversible drive shaft 90, with a tape 91 having its opposite ends wound in opposite directions about respective spools 88 and trained over the sprocket wheel 89 intermediate the spools.

Figure 5:
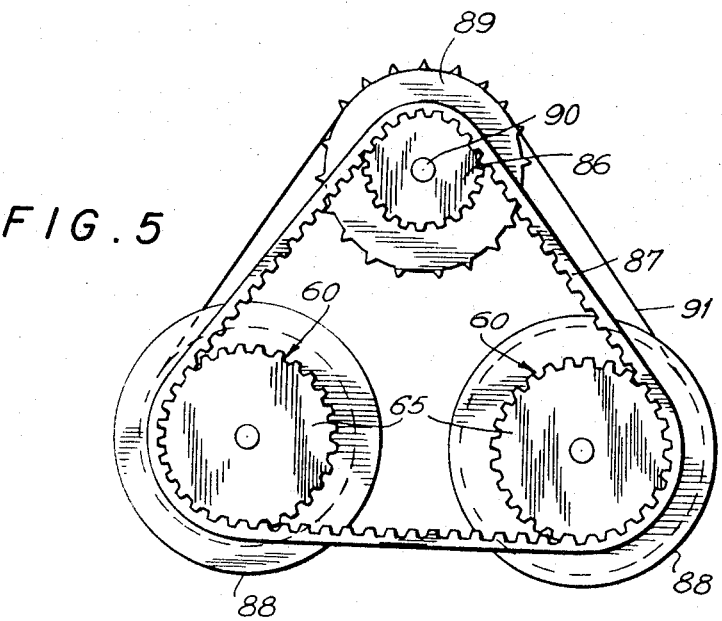
FIGURE 5 is an end view showing a tape drive employing slip elements of the type shown in FIGURE 4.

In the combination of FIGURE 5, the tape 91 may be advanced in either direction under proper tension by rotation of the drive wheel 86 in opposite directions. In one direction of drive-wheel rotation, say clockwise, the slip element 60 on the right-hand side operates as a slip clutch, while that on the left-hand side operates as a drag brake. Of course, drag braking affords the tension necessary to prevent tape spillage.

More particularly, upon clockwise rotation of drive wheel 86, the spring 80 of the right-hand element 60 is active as a slip clutch for winding the tape 91 on the right-hand spool 88, while the drag-brake spring 83 of the right-hand element 60 exerts a relatively light drag torque and is, therefore, inactive. Simultaneously the drag-brake spring 83 of left-hand element 60 is active to exert a proper torque for tensioning, while the slip-clutch spring 80 of left-hand element 60 is over-running and inactive. Upon reversal or counterclockwise direction of drive wheel 86 and belt 87 the tape 91 is wound onto left-hand spool 88 from right-hand spool 88. In this condition, the clutch spring 80 of left-hand element 60 is active to exert the winding torque while the drag-brake spring 83 of left-hand element 60 is inactive. The slip clutch spring 80 of right-hand element 60 is over-running and the drag-brake spring 83 of right-hand element 60 is active to exert the desired tension.

Obviously, the bi-directional tape drive of FIGURE 5 requires only a single reversible motor to advance the tape 91 in either direction, obviating the heretofore required additional motors or electromagnetic clutch brakes, for greater simplicity, reliability, and savings in cost.

It will also be obvious that the embodiment of FIGURE 3 is the equivalent of the embodiment of FIGURE 1 and that the embodiment of FIGURE 4 is a multiple of the embodiment of FIGURE 1. Therefore, it will be seen that the tape drive of FIGURE 5 may comprise a combination of four elements like FIGURE 1 or 2 or two each of FIGURES 1 and 2.

From the foregoing, it is seen that the present invention provides a slip element and tape drive which fully accomplish their intended objects and are well adapted to meet practical conditions of manufacture, maintenance and use.

Although the present invention has been described in some detail by way of illustration and example for purposes of clarity of understanding, it is understood that certain changes and modifications may be made within the spirit of the invention and scope of the appended claims.

What is claimed is:

1. A bi-directional controlled limit torque slip element comprising: an axially rotatable shaft, a pair of mandrels circumposed about said shaft in spaced relation therealong, one of said mandrels fixedly secured to said shaft for rotation therewith, the other of said mandrels being mounted for rotation relative thereto, an intermediate mandrel between said pair of mandrels supported on said shaft for rotation relative thereto, a first helically coiled spring wound in one direction and in frictional engagement with the surface of one of said pair of mandrels and an adjacent portion of the surface of said intermediate mandrel, a second helically coiled spring wound in the opposite direction and having one end portion in frictional engagement with the surface of the other of said mandrels and having its other end portion in frictional engagement with the other adjacent portion of the surface of said intermediate mandrel, input drive means to one of said pair of mandrels and output drive means associated with the other of said pair of mandrels whereby rotation of said first of said pair of mandrels in one direction will effect a controlled slip through one of said springs, and rotation in the opposite direction will effect a controlled slip through the other of said springs.

2. A bi-directional limit torque slip element comprising at least a pair of rotary members having generally coaxial cylindrical surfaces, said surfaces comprising an external mandrel surface and an internal drum surface, a pair of helically coiled spring parts extending in the same one direction and frictionally engaging respective cylindrical surfaces, and connection means connecting together said spring parts, said connection means comprising a continuous extension between and integral with said spring parts, each of said spring parts transmitting a different limit torque for opposite directions of rotation, an additional pair of rotary members longitudinally spaced from said first mentioned pair of rotary members and having cylindrical surfaces generally coaxial with each other and with the surfaces of said first pair of rotary members, the surfaces of said additional pair of rotary members comprising an additional external mandrel surface and an additional internal mandrel surface, an additional pair of helically coiled spring parts extending in the same other direction frictionally engaging respective additional rotary member surfaces, and additional connection means connecting together said additional spring parts, one pair of like surfaces being fixedly coupled together, whereby rotation of one of the other pair of like surfaces in one direction drives said one pair of like surfaces through one pair of spring parts with the other pair of spring parts overriding, and rotation of said one of said other pair of like surfaces in the other direction de-clutches said one pair of like surfaces through said one pair of spring parts with the other pair of spring parts braking said one pair of like surfaces.

3. A bi-directional limit torque slip element according to claim 2, said one pair of like surfaces comprising said internal surfaces.

4. A bi-directional limit torque slip element according to claim 2, said additional connection means connecting together said additional spring parts comprising an additional continuous extension between and integral with said additional spring parts.

5. A tape drive comprising: a pair of rotary tape spools, each having a pair of cylindrical internal drum surfaces; a tape extending between and having opposite ends wound about respective spools; a fixed external mandrel surface associated with each spool; a rotary external mandrel surface associated with each spool; reversible tape drive means in driving engagement with said tape; transmission means connected between said drive means and each of said rotary external surfaces; a first pair of helically coiled springs each oppositely wound and each having one part frictionally engaging a respective rotary external surface and another part frictionally engaging its adjacent internal surface; and, a second pair of helically coiled springs each oppositely wound and each having one part frictionally engaging a respective fixed external surface and another part frictionally engaging the other adjacent internal surface; whereby drive means rotation in one direction drives said rotary external surfaces and moves said tape toward one of said spools and away from the other spool, the spring of said first pair associated with said one spool being in operative driving relation with its rotary external surface to drive said one spool, the spring of said one pair associated with said other spool being in over-riding relation with its rotary external surface, the spring of said other pair associated with said one spool being in over-riding relation, and the spring of said other pair associated with said other spool being in braking relation to permit tape unwinding under tension.

References Cited

UNITED STATES PATENTS

| | | | |
|---|---|---|---|
| 1,144,673 | 6/1915 | Wheeler | 242—67.4 X |
| 3,044,724 | 7/1962 | Goodwin | 242—55 |
| 3,084,880 | 4/1963 | Grant et al. | 242—55.13 |
| 3,218,877 | 11/1965 | Kaplan | 242—75.43 X |
| 3,242,696 | 3/1966 | Kaplan | 64—30 |

NATHAN L. MINTZ, *Primary Examiner.*

U.S. Cl. X.R.

64—27